(12) United States Patent
Kuo

(10) Patent No.: US 6,799,594 B2
(45) Date of Patent: Oct. 5, 2004

(54) STRUCTURE OF A FRAMEWORK

(76) Inventor: Yi-Ching Kuo, PO Box 82-144, Taipei (TW)

( * ) Notice: Subject to any disclaimer, the term of this patent is extended or adjusted under 35 U.S.C. 154(b) by 0 days.

(21) Appl. No.: 10/119,763

(22) Filed: Apr. 11, 2002

(65) Prior Publication Data

US 2003/0024203 A1 Feb. 6, 2003

(30) Foreign Application Priority Data

Aug. 3, 2001 (TW) .................................... 90213169 U

(51) Int. Cl.[7] ............................................. E04H 15/48
(52) U.S. Cl. ...................... 135/147; 135/122; 135/151; 135/157; 135/120.3; 52/655.2; 52/656.9; 403/171; 403/176; 403/180; 403/200
(58) Field of Search ................................. 135/143–147, 135/151, 157, 120.3, 122, 120, 131; 403/171, 170, 175, 176, 180, 200; 52/648.1, 655.1, 655.2, 655.9, 109

(56) References Cited

U.S. PATENT DOCUMENTS

| | | | | |
|---|---|---|---|---|
| 3,354,596 A | * | 11/1967 | Schafer | |
| 4,637,180 A | * | 1/1987 | Zeigler | ........................ 52/109 |
| 4,663,899 A | * | 5/1987 | Nodskov et al. | ............. 52/109 |
| 4,667,451 A | * | 5/1987 | Onoda | ......................... 52/648 |
| 5,327,700 A | * | 7/1994 | Sorenson et al. | ............. 52/109 |
| 6,161,359 A | * | 12/2000 | Ono | ......................... 52/651.1 |
| 6,553,698 B1 | * | 4/2003 | Kemeny | ...................... 40/610 |

* cited by examiner

Primary Examiner—Carl D. Friedman
Assistant Examiner—Yvonne M. Horton
(74) Attorney, Agent, or Firm—Leong C. Lei

(57) ABSTRACT

An improved structure of a framework is disclosed. The structure includes a plurality of connectors having provided with holes, and notch seats are employed in the framework for connecting side rods, slanting rods, and supporting device to form into a stable and conveniently foldable framework. The end section of the side rod is mounted with a rotatable connector for interlinking of the side rods. This facilitates the extension of the framework vertically and/or horizontally.

3 Claims, 11 Drawing Sheets

STRUCTURE OF A FRAMEWORK

BACKGROUND OF THE INVENTION (a) Field of the Invention

The present invention relates to a framework which is retractable, and is convenient to fold and dismantle and is an easily operated displaying framework.

(b) Description of the Prior Art

Conventional displaying or decoration framework normally does not provide with retractable or foldable structure. Accordingly, it is not convenient when the framework is not in use and/or is transported. In addition, most of the conventional displaying frameworks are complicated in structure. Therefore, it is an object of the present invention to provide an improved structure of a framework which mitigates the above-mentioned drawback.

SUMMARY OF THE INVENTION

Accordingly, it is a main object of the present invention to provide an improved structure of a framework, wherein a plurality of connectors having provided with holes, and notch seats are employed in the framework for connecting side rods, slanting rods, and supporting device to form into a stable and conveniently foldable framework. The end section of the side rod is mounted with a rotatable connector for interlinking of the side rods. This facilitates the extension of the framework vertically and/or horizontally.

Yet another object of the present invention is to provide an improved structure of a framework, wherein a covering screen can be mounted to the framework and the connector is provided with engaging slots for the holding and securing of a securing plate having a holding element so as to mount a covering screen which can appropriate cover the framework.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF TIE DRAWINGS

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
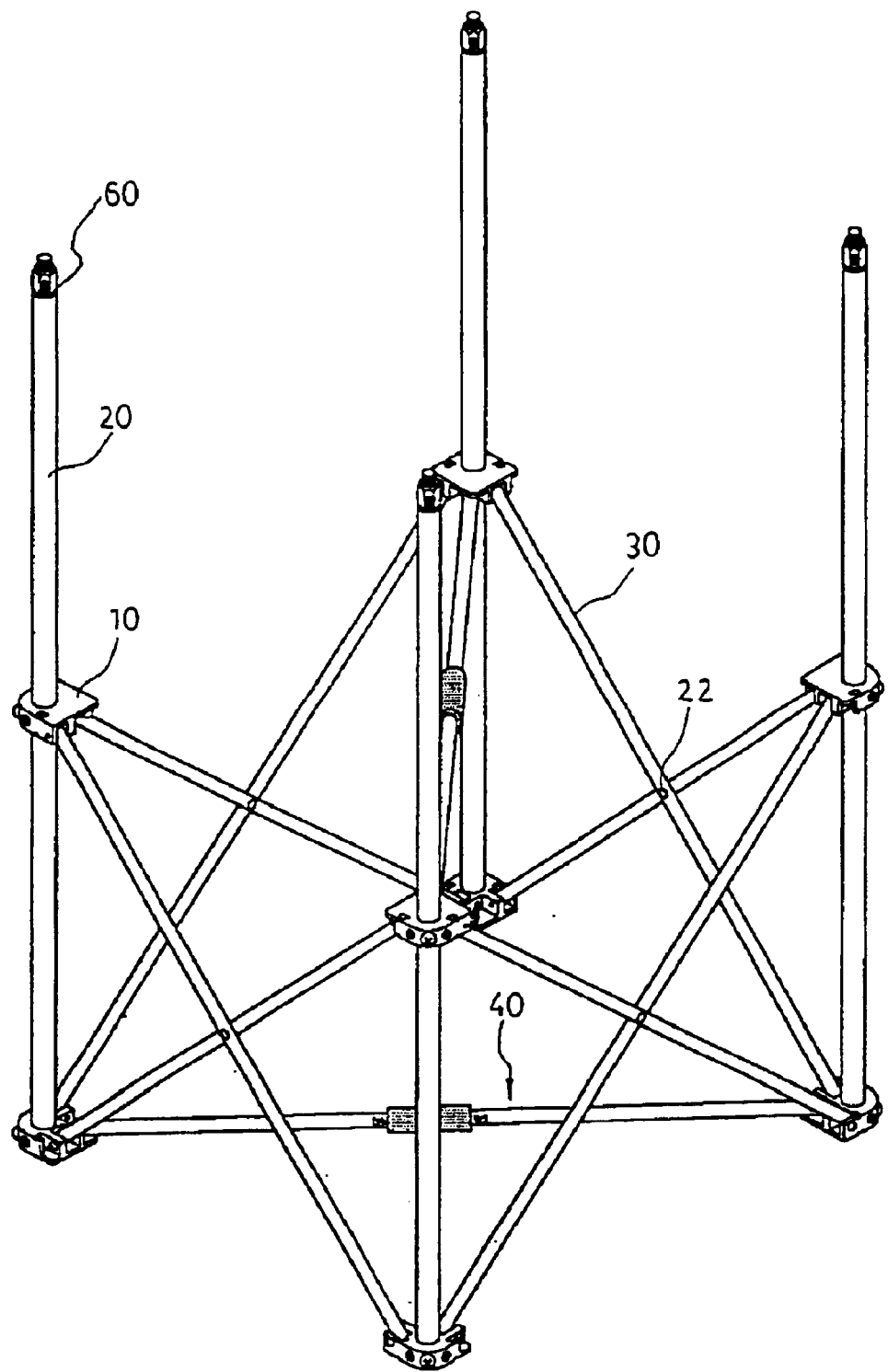
FIG. 1 is a perspective view of the framework in accordance with the present invention.
Figures 2, 2A:
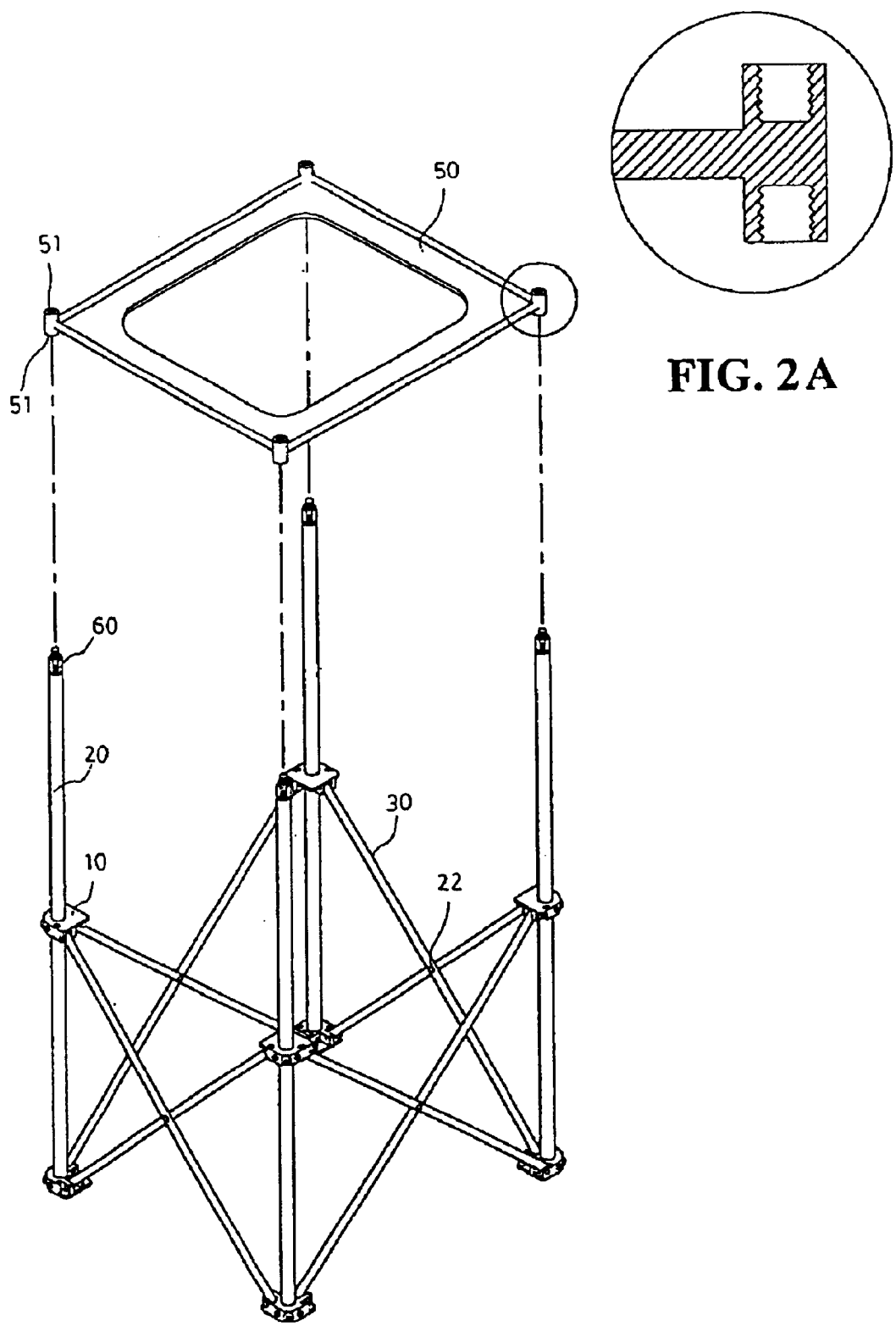
FIG. 2 is a perspective view of a securing framing element of a framework in accordance with the present invention.
FIG. 2A is an enlarged sectional view of a portion of FIG. 2.
Figure 3:
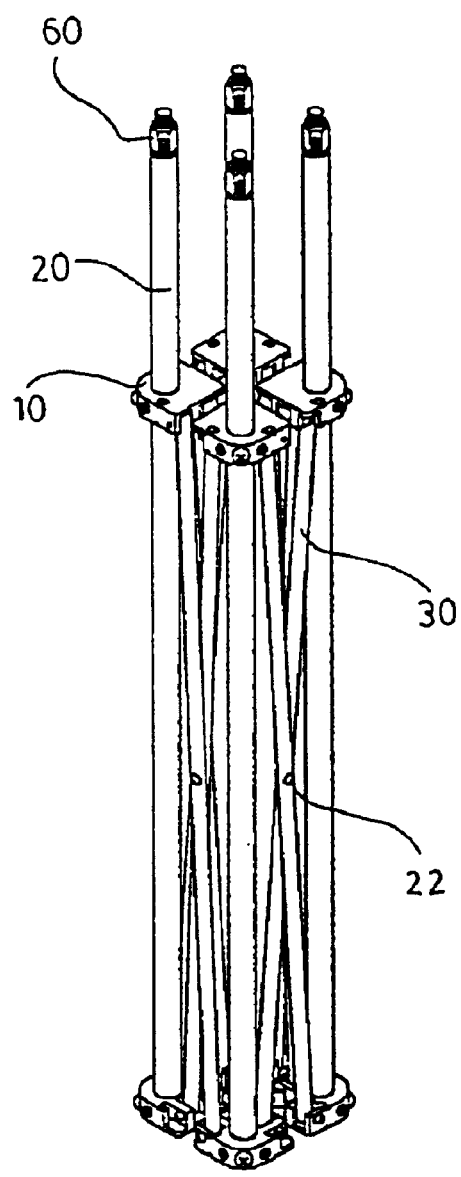
FIG. 3 is a perspective view of a folded framework of the present invention.
Figure 4:
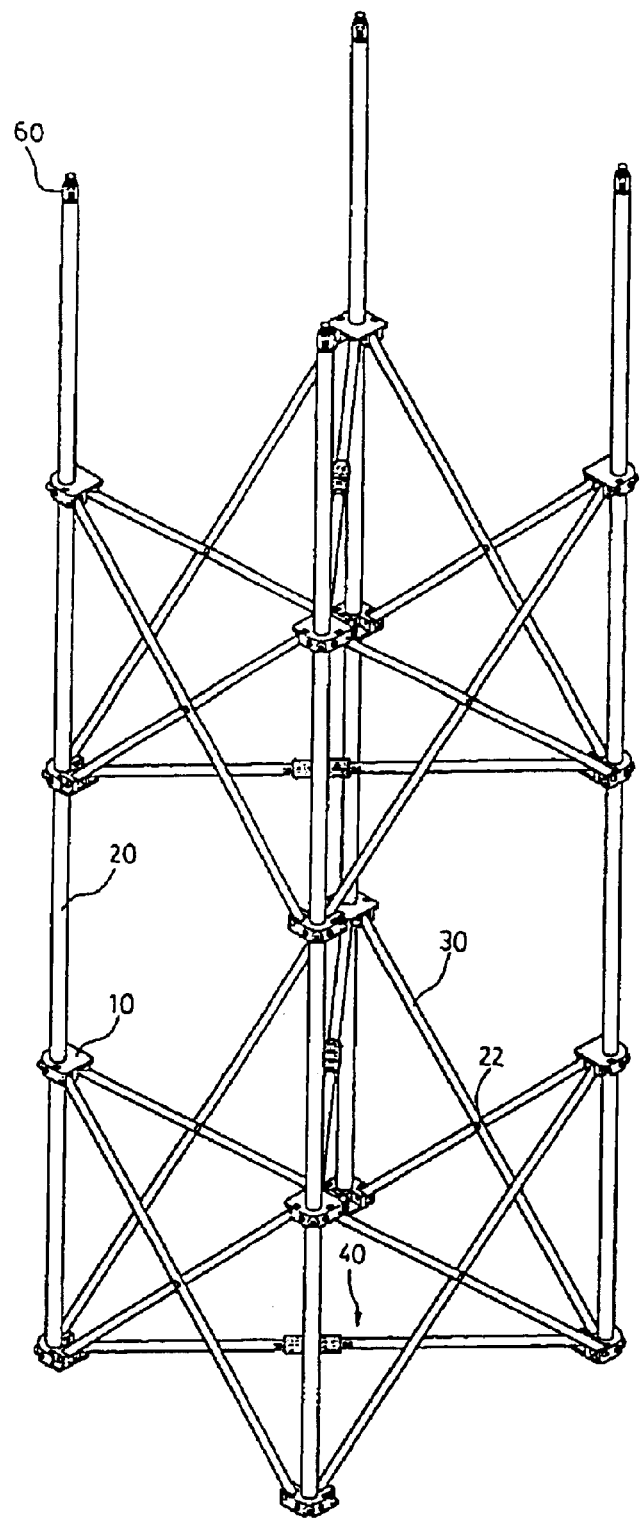
FIG. 4 is a perspective view showing a two layered framework of another preferred embodiment of the present invention.
Figure 5:
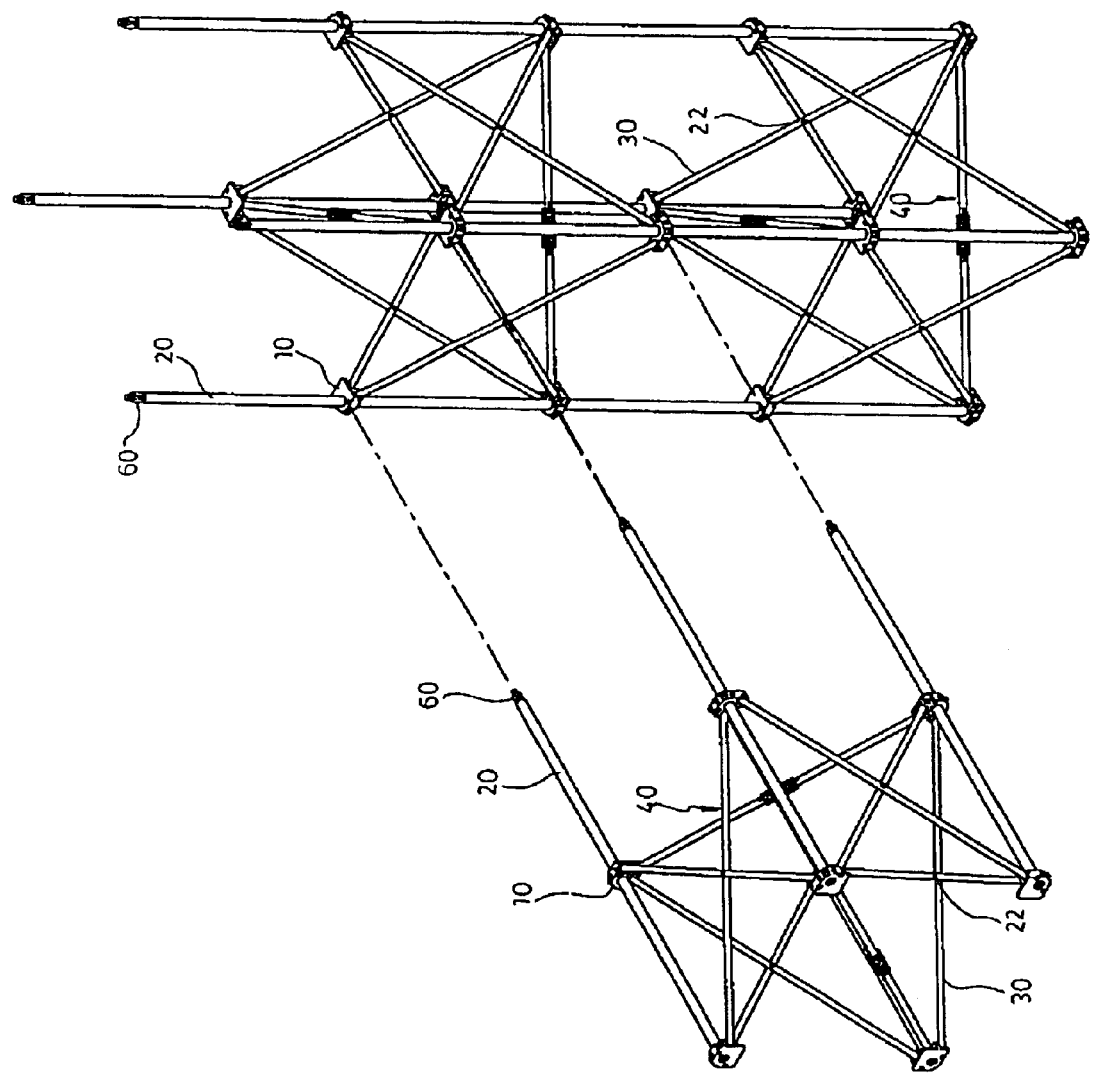
FIG. 5 is a perspective view showing a framework with vertically and horizontally extended structure in accordance with the present invention.
Figure 6:
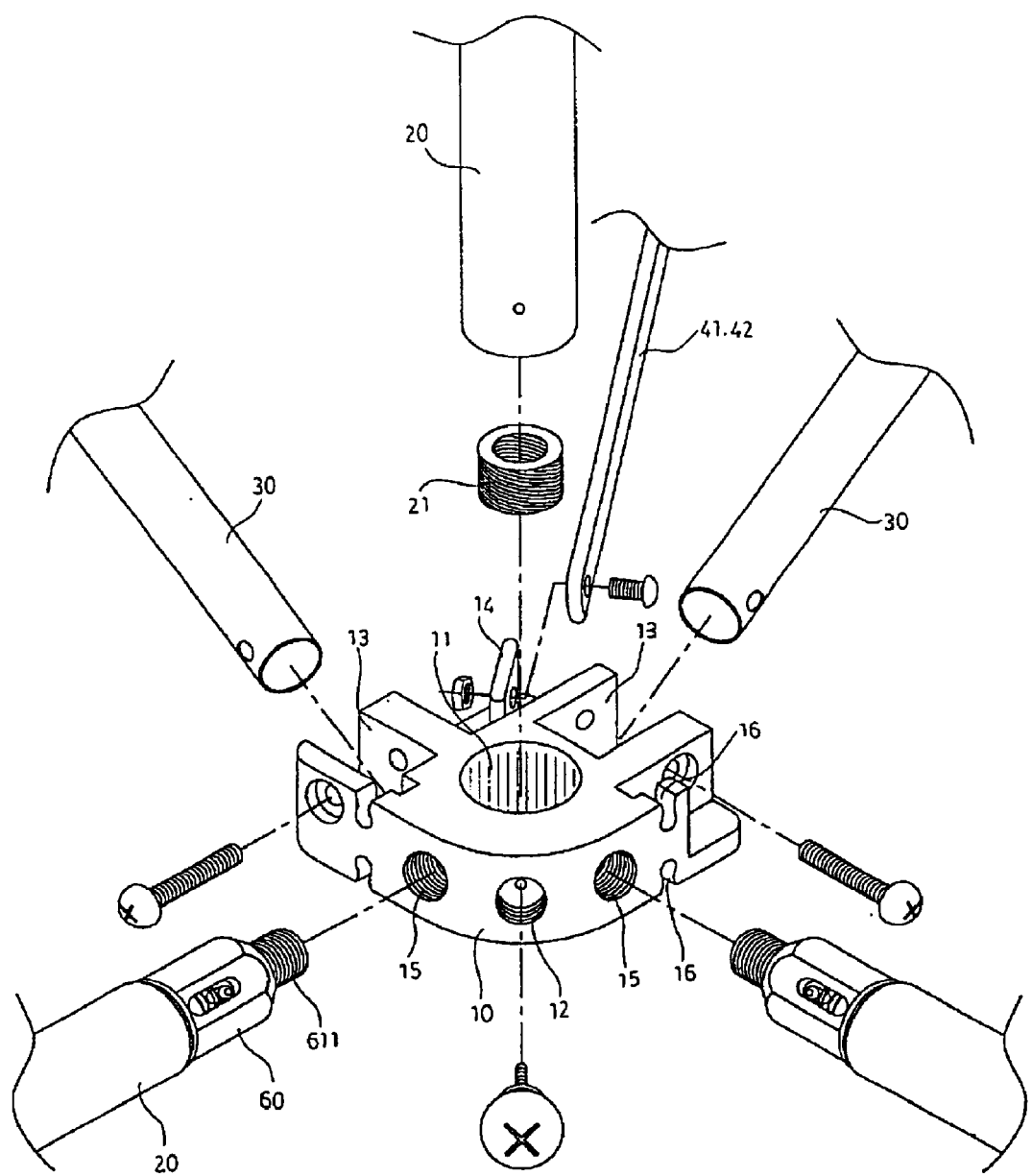
FIG. 6 is a perspective exploded view of a connector in accordance with the present invention.
Figure 7:
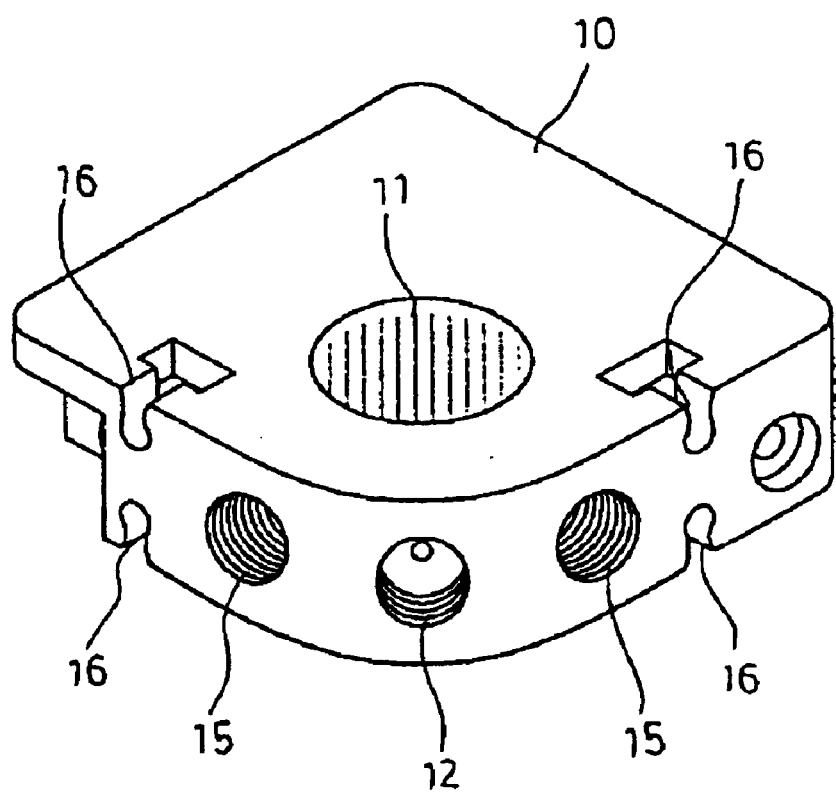
FIG. 7 is a schematic view of a connector in accordance with the present invention.

Referring to FIGS. 1, 6 and 7, there is shown a framework in accordance with the present invention comprising connectors 10, side rods 20, sloping rods 30, and a supporting device 40. On the connector 10, there a through hole 11 allowing the side rod 20 to pass through. A securing hole 12 is provided on the connector 10 such that a screw element can be inserted into the securing hole 12 and the side rod 20 is mounted. One end of the side rod 20 is provided with a screw nut 21 with internal screw threads for mounting with the end portion of another side rod 20 such that the side rod 20 is provided with a vertical extension function (shown in FIG. 4). The connector 10 is provided with a notch seat 13, which can enhance the strength of the connector 10 and allow the sloping rod 30 to be pivotally mounted. The connector 10 is mounted with rib body 14 for pivotal mounting with the supporting device 40. A screw hole 15 is provided to the connector 10 for horizontal connection with the side rod 20 so that the framework can be extended in horizontal (referring to FIG. 5). The top and bottom edges of the connector 10 are provided with an engaging slot 16 for the holding of a holding element so as to mount with a screen-covering device By using the connector 10 being mounted at the four corners of the top and bottom of the framework, the side rod 20 can be mounted to the sides of the framework in an alternative arrangement. The junction point of the side rod 20 is provided with moveable pivotal point. Thereby, the framework can be extended outward to form a stable structure and the structure can be retracted into a minimum volume (referring to FIG. 3). In order to avoid retraction as a result of inappropriate external force after the framework is extended, the supporting device 40 is extended outward such that the framework will not be retracted inward. In another alternative, a securing framework 50 (referring to FIGS. 2 and 2A) having a top and bottom screw holes 51 at four corners is used such that the screw holes 51 are respectively corresponding to the end portion of the side rod 20. Thus, the extended framework can be secured.

Figure 8A:
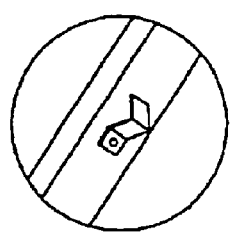
FIG. 8A is an enlarged view of a portion of FIG. 8.
Figure 8:
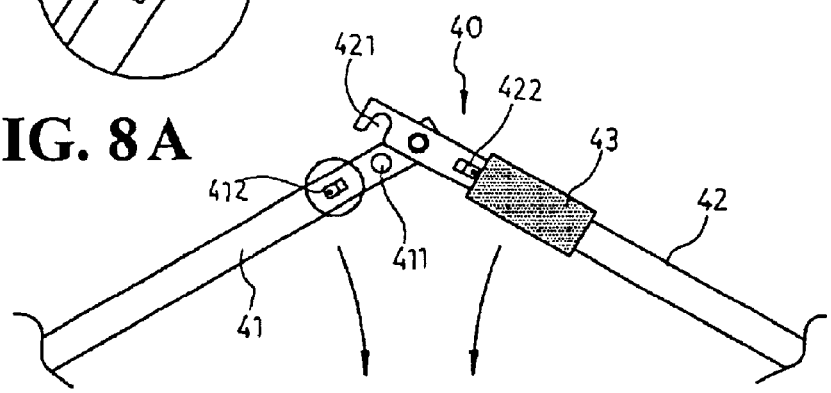
FIG. 8 shows the operation of the supporting device in accordance with the present invention.
Figure 8:
Figure 8:
Figure 8:
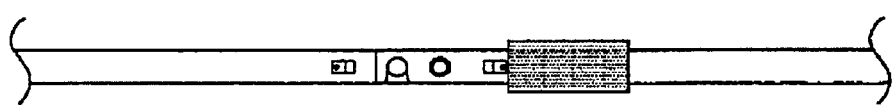
Figure 8:
Figure 8:
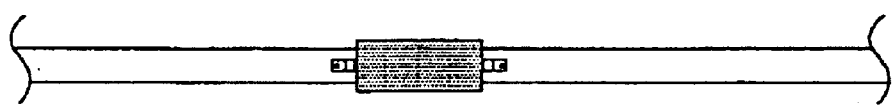

Referring to FIGS. 1, 8 and 8A the supporting device 40 includes two side members 41, 42 and a sliding mount 43, wherein the side members 41, 42 are respectively extended at a same plan but diagonally from the connector 10, and the front ends of the side members 41, 42 are pivotally joined to each other forming into a foldable and extendable structure. The framework is provided with corresponding engaging protrusion 412, notch 421 and a resilient plate 422, wherein the side member 42 is provided with a sliding mount 43 which can slide on the side member 42.

Thus, when the framework is extended and the two side members 41, 42 are fully stretched out. The notch 421 at the front section of the rod body is directly engaged with the engaging protrusion 411 so that the framework is formed into a sloping structure. In order to avoid dislocation as a result of inappropriate external force, the sliding mount 43 of the side member 42 is first pressed the resilient plate 422 and the sliding mount 43 slides to the engaged region to cover the notch 421, the engaging protrusion 411. When the resilient plate 422 is urged by the two sides of the sliding mount 43, the sliding mount 43 will not move. As a result, the side members 41, 42 will not be retracted as a result of inappropriate external force. Thus, the straight extension of the side members 41, 42 is obtained. If the two side members 41, 42 are to be folded, the sliding mount 43 slides away from the engaging region, and the side members 41, 42 can be easily folded.

Figure 9:
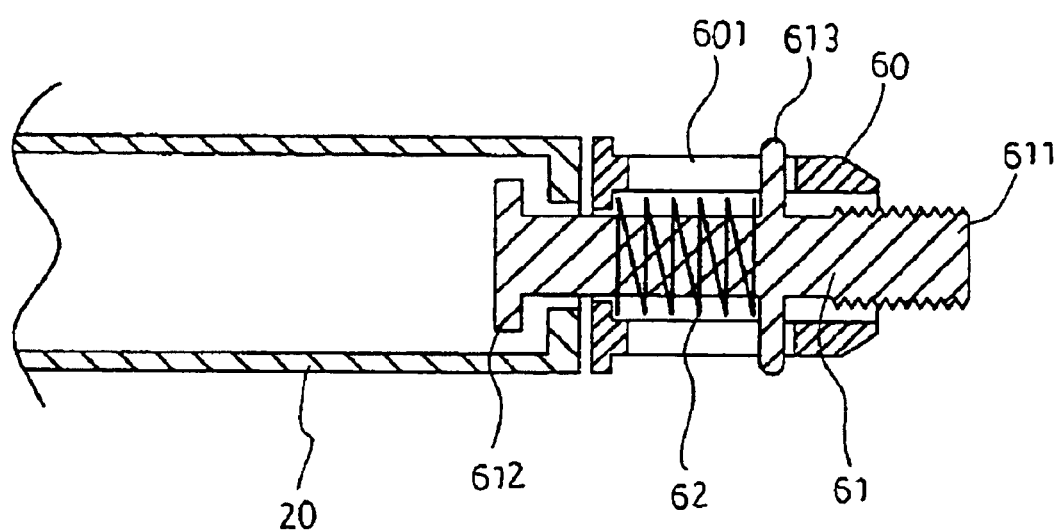
FIG. 9 is a sectional view of the rotating connector in accordance with the present invention.

Referring to FIGS. 6 and 9, the side rod 20 is provided with a screw mount 21 at one end, and is provided with a rotating connector 60 at the other end such that the end sections of the side rods 20 are interconnected. When the rotating connector 60 is rotated, connection with the side rod 20 is made without rotating the rotating side rod 20. The rotating connector 60 is hollow and the interior is provided with a shaft 61 having a head portion with thread section 611. The end terminal of the shaft 61 provided with a protruded edge 612 is used to extend into the side rod, and is corresponding to the side rod 20 so that it can be rotated without dislocation, and the surface of the rotating connector 60 is provided with a sliding slot 601 allowing the protruded protrusion 613 of the shaft 61 to be emerged. Thus, when the rotating connector 60 rotates, the shaft 61 together with the thread portion 611 rotates and it connects to another side rod 20. The shaft 61 is mounted with resilient element 62 such that the protruded protrusion 613 can slide along the sliding slot 601 so that the shaft 61 is elastically retractable so as to suit the depth of screw connection of various screw hole.

Figure 10A:
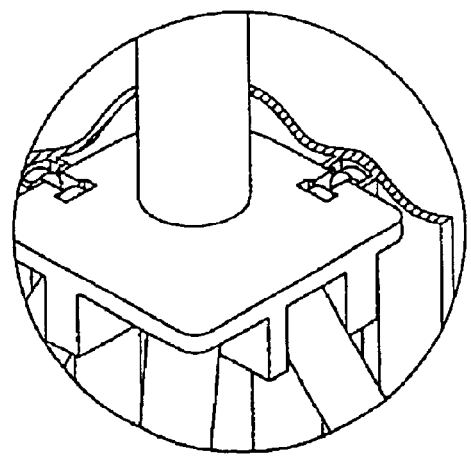
FIG. 10A is an enlarged view of a portion of FIG. 10.
Figure 10:
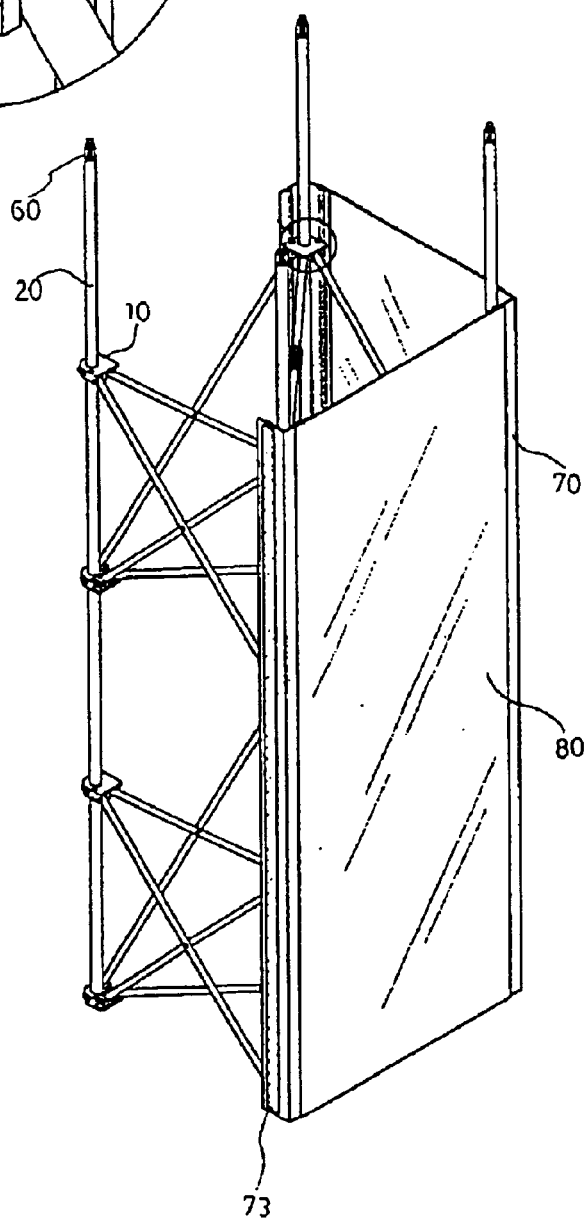
FIG. 10 is a schematic view of the framework mounted with the covering screen in accordance with the present invention.
Figure 11:
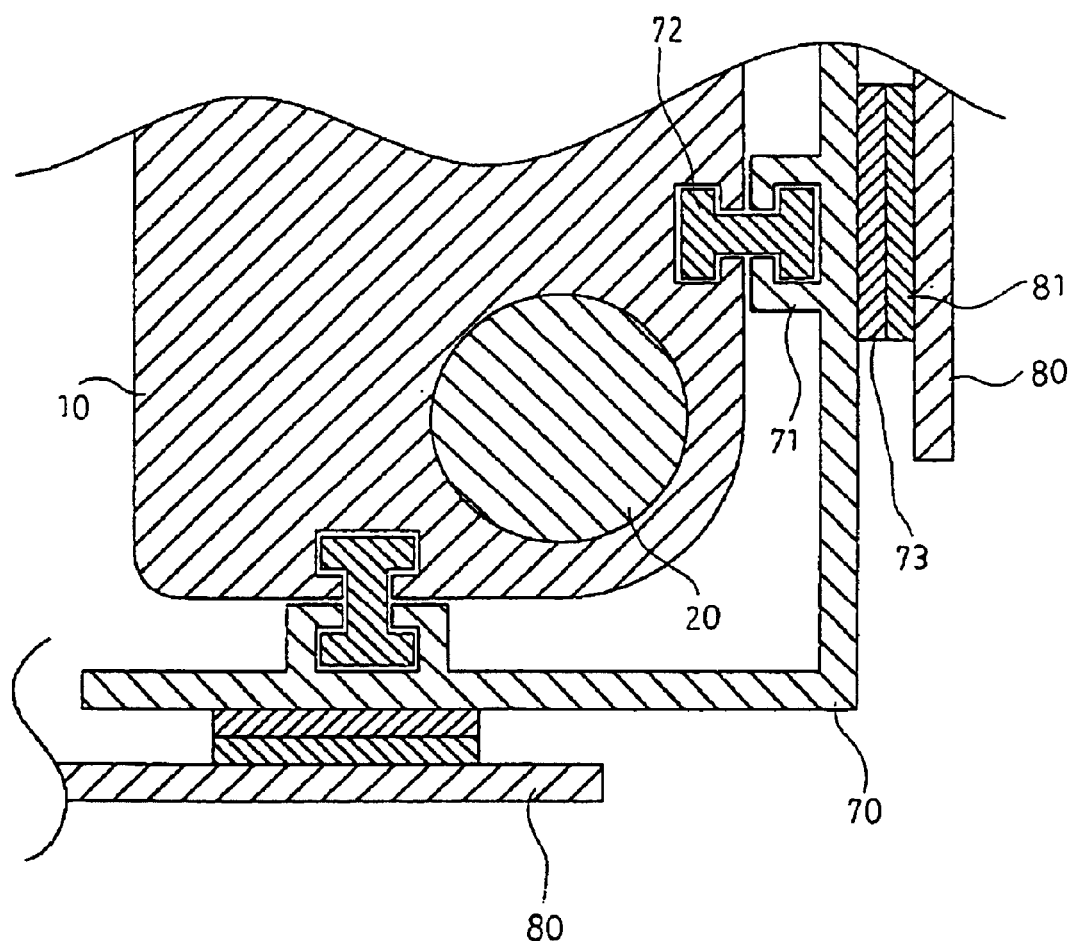
FIG. 11 is a sectional view of a portion of the present invention.

Referring to FIGS. 10, 10A and 11, the four sides of the framework are mounted with appropriate covering screen 80 for ornamental decoration. The holding structure of the covering screen 80 is a L-shaped securing plate 70 having a sliding rail 71 to match with the engaging slot 16 of the connector 10. The external shape of the securing plate 70 is a design where the corners of the framework can be covered. The sliding rail 71 is provided with "I"-shaped holding element 72. One protruded end of the holding element 72 is inserted into the sliding rail 71, and the other protruded end is made of plastic material of appropriate resilient and can be directly inserted into the engaging slot 16 for holding. Thus, the external surface of the securing plate 70 is provided with magnetic element 73 such that the covering screen 80 having a larger surface area provided with the magnetic element 73 of the securing plate 70 is adhered to the magnetic element 81 at the internal side. As a result, the covering screen 80 is mounted to the framework and the covering screen 80 is positioned at the four sides of the framework.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a retractable framework including side rods, sloping rods, connectors, and rotating connectors, the connectors being positioned at the corners of the framework for connecting with the side rods and the sloping rods, the side rods being extended from the corners of the framework and the sloping rods being alternately positioned at the lateral face of the framework, the end portion of the sloping rod being connected to the connector, characterized in that:

(a) the connector is provided with through holes for the insertion of the side rod and is provided with a securing hole for mounting with a screw element to lock the side rod, the connector is also provided with a notch for the pivotal connection of the sloping rod, and the connector is provided with a screw hole to horizontally mount with the side rod;

(b) the side rod having one end provided internally with a screw mount and the other end portion mounted with a respective one of the rotating connectors which provides an extension connection;

wherein the supporting device includes two side rods and a sliding mount, the side rods are extended diagonally on the same plane from the connector, the front ends of the side rods are pivotally connected, and the rod body is respectively provided with an engaging protrusion, notch and resilient plate, and the sliding mount is slidably provided on the side rod.

2. The structure of claim 1, wherein the top and bottom edge of the connector is provided with an engaging slot for mounting a covering screen.

3. The structure of claim 1, wherein the covering screen is an L-shaped securing plate having a sliding rail in combination with the engaging slot of the connector, the shape of the securing plate is designed to cover the corners of the framework and the sliding rail is provided with a holding element, one protruded end of the holding element is engaged with the sliding rail, and the other protruded end is directly engaged with the engaging slot to provide a suspension, the outer surface of the securing plate is provided with a magnetic element such that the covering screen mounted with the magnetic element is internally adhered to the magnetic element provided on the securing plate.

* * * * *